US006294766B1

United States Patent
Autry et al.

(10) Patent No.: US 6,294,766 B1
(45) Date of Patent: Sep. 25, 2001

(54) BATTERY CELL BYPASS WITH PRE-LOADED COMPRESSION ACTION

(75) Inventors: Tracy A. Autry, Dove Canyon; Fernando C. Lynch, Anaheim; Don Mathes, Apple Valley, all of CA (US)

(73) Assignee: Microsemi Corporation, Santa Ana, CA (US)

( * ) Notice: Subject to any disclaimer, the term of this patent is extended or adjusted under 35 U.S.C. 154(b) by 0 days.

(21) Appl. No.: 09/364,987

(22) Filed: Jul. 31, 1999

(51) Int. Cl.$^7$ ................................ H05B 3/02; H02J 7/00
(52) U.S. Cl. ................................ 219/507; 320/122
(58) Field of Search ............................. 219/507; 320/122, 320/119; 307/48, 53, 77; 361/54

(56) References Cited

U.S. PATENT DOCUMENTS

| 4,789,346 | * | 12/1988 | Frantz | 439/80 |
| 5,024,503 | * | 6/1991 | Gunn et al. | 385/53 |
| 5,688,150 | * | 11/1997 | Seidler et al. | 439/876 |
| 5,733,501 | * | 3/1998 | Takao et al. | 420/562 |
| 5,880,575 | * | 3/1999 | Itou et al. | 320/122 |
| 5,898,239 | * | 4/1999 | Kawam | 307/130 |
| 5,932,990 | * | 8/1999 | Kaneko | 320/122 |
| 5,942,185 | * | 8/1999 | Nakatsuka et al. | 420/562 |
| 5,969,504 | * | 10/1999 | Cutchis | 320/121 |
| 6,046,514 | * | 4/2000 | Rouillard et al. | 307/77 |

* cited by examiner

Primary Examiner—Teresa Walberg
Assistant Examiner—Daniel Robinson
(74) Attorney, Agent, or Firm—Gary C. Honeycutt; Michael A. Sileo, Jr.; Arthur I. Navarro

(57) ABSTRACT

A battery cell bypass protection technology for use with NiH2 (or other energy storage) cells on a spacecraft or other high reliability application. The device is a thermally activated switch, designed to bypass the current around a failed (open) or failing cell so that the other cells in the battery are unaffected. One unique aspect of the design is a "pre-loaded" compression action, solder shorting mechanism. Another unique aspect is that the construction employs series redundant heaters and blocking diodes in multi-chip packages. These unique aspects provide consistent and complete shorting to provide a low-resistance cell bypass in any orientation on earth (1g) or in orbit (0g). Another unique aspect is the use of non-lead-based solder that minimizes "creep" over time and temperature.

4 Claims, 1 Drawing Sheet

BATTERY CELL BYPASS WITH PRE-LOADED COMPRESSION ACTION

BACKGROUND OF THE INVENTION

This invention relates generally to a thermally activated low-resistance permanent battery cell bypass around a failing or open cell. The technology is designed for use with NiH2 battery cells commonly used on spacecraft. The invention may be used in other applications as well. The bypass for high capacity (>100 Ah) $NiH_2$ cells should be a low dissipation switch. There are several existing patents for this type of device. All of the devices operate from the current supplied by the battery, shunting through the device, which activates the switch to close the circuit and bypass the cell. The designs typically fall into one of the three following categories:

1. A semiconductor (purely electronic) switch.
2. A mechanical (fuse or relay) switch.
3. A thermally activated semiconductor (thermal, shape memory metal, or low melting point metal alloy) switch.

The thermally activated switch utilizes a semiconductor device during normal operation, so that it never experiences an open circuit condition. An early example of this technology uses a diode in parallel with the cell and a thermal switch connected to a relay (Hall, Thomas, Hughes, 1993, Reversible Automatic Cell Bypass Circuit, U.S. Pat. No. 5,258,244). When the cell fails, the current heats the diode, activating the thermal switch, which activates a relay. The concerns with this design are high cost and complexity, and long-term mechanical integrity of the contacts over time and thermal cycling. Another early example a "thermally-activated, shorting diode switch", which operates based on the cell current heating the diode, then a solder preform melting across the diode to create a short-circuit (Herrin, Jerry, Hughes, 1988, Thermally-activated, Shorting Diode Switch having Non-operationally-alterable Junction Path, U.S. Pat. No. 4,774,558). This device apparently was never used in an application, and other than being somewhat complicated, it is the most similar design to the invention.

Martin Marietta (now Lockheed Martin) patented a novel cell bypass circuit using diodes to heat a shaped memory metal (SMM) rod which expands to close the contact (Kawam, Elias, Martin, 1996, Electro-thermally Actuated Switch, U.S. Pat. No. 5,510,598). The problem with this device is complexity and relatively high cost due to special plating requirements for the gold contact. ESTEC, AEA, and Matra Marconi Space have designed a thermally activated switch using diodes to heat a low melting point metal to create a short-circuit connection with a low-resistance contact (Dudley, G. J. et. al., ESA-ESTEC, 1998, Development and Pre-qualification Testing of a Low-dissipation Battery Cell Open Circuit Protection Device, French Patent?). The advantages of this design include a strong immunity to false triggering and a "self-healing" characteristic.

SUMMARY OF THE INVENTION

The object of this invention is to eliminate the concerns of the previous designs and to minimize the cost of the components, the assembly, and the complexity of the design. A major goal was to provide a low cost device that could be slightly modified and used universally across many applications, thus further reducing the price due to the economies of scale. Cell manufacturers have not standardized the size and location of the anode and cathode cell terminals, therefore the device must be "adjustable" to accommodate different mechanical configurations.

The electronics of this device are similar to the classic discrete $NiH_2$ cell bypass circuit, except bipolar diodes are used both in the charge and discharge directions. This means that the device will operate as a classical bypass circuit when connected to a healthy cell. In the event of a cell (open or high resistance) failure, the discharge or charge diodes will generate heat and melt solder to make a permanent, low resistance short-circuit. FIG. 1 illustrates the schematic of the device:

The unique elements of the invention include:

1. The solder relies on a specially controlled "pre-loaded" compression action to guarantee that proper wetting of the contacts will occur. The design is such that the activation of the switch can be demonstrated on earth because the amount and placement of the solder overcomes the formation of oxides and intermetallics.

2. The activation mechanism utilizes multiple, redundant heaters (diodes) and a mechanical compression (spring) to ensure fail-safe operation.

3. Series diodes in both direction (charge and discharge) for redundancy in case of individual diode blocking failure.

4. Non-lead-based solder ingot to minimize "creeping" under time, temperature, and pressure.

The device is held together by mechanical means, thus it is immune to failure from solder fatigue during long-term thermal cycling or false triggering due to vibration or electrical spikes. The copper leads provide low resistance and maximum stress relief and flexibility to prevent damage during assembly onto the cell. The device has a "self-healing" design, whereby the more current that bypasses the cell; the more the heater diodes will melt the solder and enhance the contact. The device cannot fail open, because that is not a failure mode associated with direct bond diodes.

The switch cannot be triggered by external heating below 200° C. Only an abnormally high charge or discharge current through the bypass device can activate the switch. If this occurs, the non-lead-based solder re-flows at over 200° C. and creates a low resistance internal short-circuit. The use of a non-lead-based solder ingot minimizes "creeping" under time, temperature, and pressure. This prevents the solder under compression from prematurely collapsing and causing an unintended short across a healthy cell.

The diodes are capable of sustained operation at 300° C., thereby allowing significant thermal design margin. Test data on diodes with similar construction indicates no failures on 200 devices under forward or reverse bias at 300° C. after 3,000 hours of operation. This eliminates the requirement that the diodes be operated within normal specified junction temperatures (typically 200° C.).

The product uses standard "off-the-shelf" hermetic surface mount devices (SMD) from a high volume manufacturing line to lower costs. The entire device utilizes only simple metals and hardware, available from any source. The design is simple, so it can be scaled for any capacity cell while using the same basic components and changing only the number of SMD and the lead size. The device weighs typically less than 40 grams (depending on the lead length), which is lighter than existing bypass technologies.

DETAILED DESCRIPTION

The above-stated objects and advantages are achieved in accordance with the specifications and drawings that follow.

Figure 1:
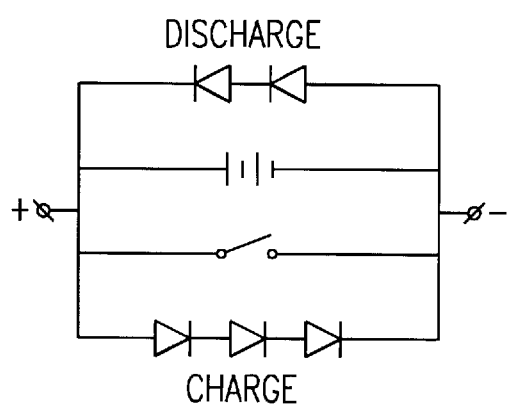
FIG. 1 is a schematic diagram of the invention.
Figure 2:
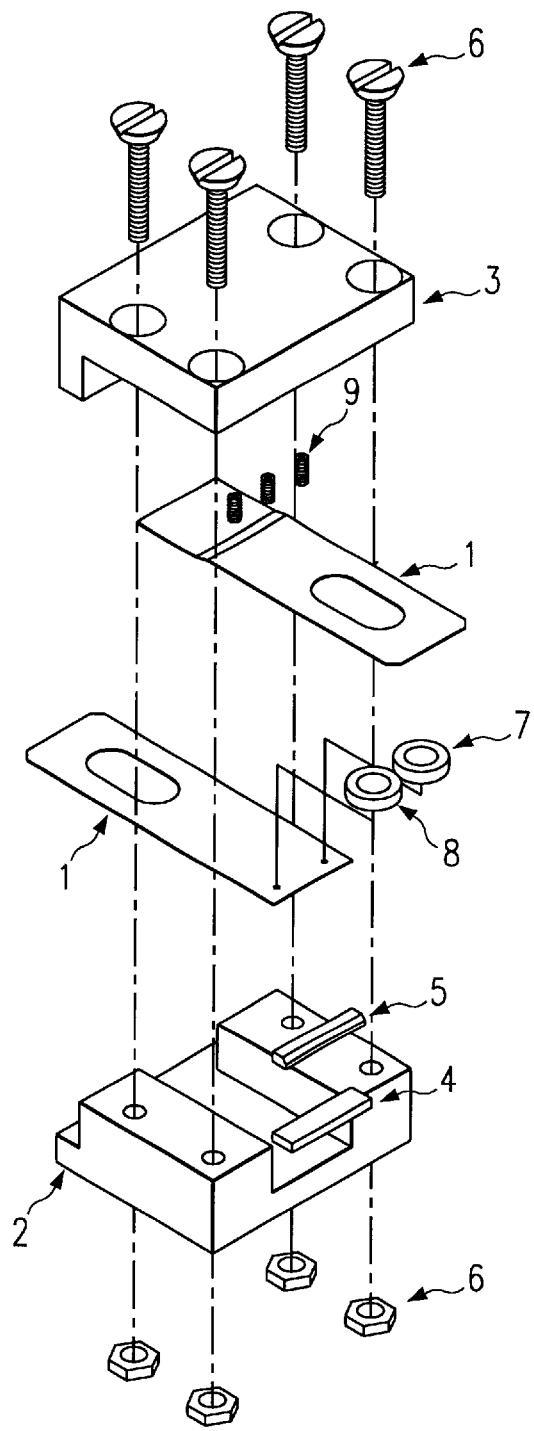
FIG. 2 is an exploded view of the invention.

FIG. 2 is an exploded view of the invention, a thermally activated battery cell bypass technology using pre-loaded compression action with multiple heaters and blocking diodes, and non-lead-based solder ingot.

The charge and discharge diode die are assembled in a surface mount hermetically sealed package. The typical device of the invention is designed for a 150 Ah $NiH_2$ cell. There are typically two discharge diodes in series for redundancy, in case one diode fails short (since this type of diode does not fail open). The discharge diodes' main function is to operate as heaters to re-flow the solder, thereby closing the switch. There are typically three or four charge diodes in series, depending on the charge voltage and/or leakage current requirements of the cell/battery. The charge diodes also can operate as heaters to melt the solder.

The mechanical components of the invention are as follows: copper straps (1) with slots for mounting onto the cell terminals, bottom high temperature plastic shell (2), top high temperature plastic shell (3), isolation spacer (4), non-lead-based solder ingot (5), mechanical hardware (6), discharge/heater diodes (7), charge diodes (8), and compression springs (9). The diodes themselves are hermetically sealed to prevent moisture from penetrating the junction and degrading performance, however the switch itself is not hermetic. In future embodiments, it is conceivable to provide a hermetic enclosure for the switch.

The device is made by first pre-tinning (solder coating) both straps in the contact area with the same non-lead-based solder. Simultaneously, the non-lead-based solder ingot (5) and the isolation spacer (4) are soldered together and onto one of the copper straps (1). The following components are then bolted together using the self-locking mechanical hardware: the bottom shell (2), the copper straps (1) with the solder ingot (5) and isolator (4) already attached, the discharge diodes (7), the charge diodes (8), the springs (9), and the top shell. The high temperature plastic shell provides structural integrity as well as protecting the switch from foreign debris.

The unique construction of the activation portion of the switch provides a "pre-loaded" solder compression action. The solder volume is controlled to completely fill the space between the contacts when the switch is thermally activated. When the solder melts, it has no place to flow other than within the predetermined contact area. This causes the solder to bond to both contacts, creating a low-resistance current bypass.

It is possible in the event that the cell fails gradually, that the solder would not fully melt to close the switch. In this case, the device is "self-healing". If the solder does not completely flow, it will be heated again on subsequent discharge or charge cycle(s) and continue to melt until it completely activates the switch and creates a low-resistance bypass.

It is apparent that there has been provided in accordance with this invention an improved technology for a battery cell bypass device, fully satisfying the objects, means and advantages set forth above. While the invention has been described in combination with specific embodiments and examples thereof, many alternatives, modifications and variations will be apparent to those skilled in the art, after reading the foregoing description. For example, although a pre-loaded compression action shorting device is illustrated in detail, the invention also applies to any other pre-loaded compression action shorting devices. Accordingly, it is intended to embrace all such alternatives, modifications and variations within the spirit and scope of the appended claims.

What is claimed is:

1. A battery cell bypass circuit assembly comprising a) a plurality of series-connected diodes; b) means for connecting said diodes in parallel with said cell; and c) a thermally activatable mechanism for bypassing current around the cell, in the event it should fail, said mechanism comprising:

a solder ingot fixed adjacent said diodes, so that the ingot will melt whenever cell failure causes said diodes to heat; and compression means for confining the flow of melted solder within the diode contact area, so that bypass current flows through the solder, which solidifies to form a permanent solder bond.

2. A battery cell bypass assembly as in claim 1 having multiple, series, redundant discharge and charge heaters (diodes) to ensure fail-safe operation.

3. A battery cell bypass assembly as in claim 1 using a non-lead-based solder to minimize "creeping" under time, temperature, and pressure.

4. An assembly as in claim 1 wherein said compression means for confining solder flow includes a spring.

* * * * *